United States Patent
Lin et al.

(10) Patent No.: US 10,691,467 B2
(45) Date of Patent: Jun. 23, 2020

(54) BOOTING METHOD USING SYSTEM FIRMWARE WITH MULTIPLE EMBEDDED CONTROLLER FIRMWARES

(71) Applicant: Wistron Corporation, New Taipei (TW)

(72) Inventors: Wen-Tai Lin, New Taipei (TW); Yu Ting Lee, New Taipei (TW); Deng Yi Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 127 days.

(21) Appl. No.: 15/987,412

(22) Filed: May 23, 2018

(65) Prior Publication Data
US 2019/0303171 A1 Oct. 3, 2019

(51) Int. Cl.
*G06F 9/4401* (2018.01)
*G06F 13/42* (2006.01)
*G06F 13/16* (2006.01)

(52) U.S. Cl.
CPC ........ *G06F 9/4411* (2013.01); *G06F 13/1668* (2013.01); *G06F 13/4282* (2013.01)

(58) Field of Classification Search
CPC ............... G06F 9/4411; G06F 13/4282; G06F 13/1368; G06F 13/1668
See application file for complete search history.

(56) References Cited

U.S. PATENT DOCUMENTS

| | | | | |
|---|---|---|---|---|
| 2005/0289248 A1* | 12/2005 | Payne | ..................... | G06F 9/441 710/8 |
| 2007/0143589 A1* | 6/2007 | Rawe | ..................... | G06F 9/441 713/2 |
| 2007/0300055 A1* | 12/2007 | Sip | ..................... | G06F 9/4401 713/2 |
| 2013/0013905 A1 | 1/2013 | Held et al. | | |
| 2014/0075169 A1* | 3/2014 | Andrews | ............... | G06F 9/4416 713/2 |
| 2016/0188345 A1* | 6/2016 | Chen | ..................... | G06F 9/4403 713/2 |
| 2018/0150293 A1* | 5/2018 | Nachimuthu | ....... | H04L 41/0816 |

FOREIGN PATENT DOCUMENTS

TW 201207731 A 2/2012

OTHER PUBLICATIONS

Office Action dated Aug. 22, 2018 in corresponding Taiwan Patent Application No. 107110833.

* cited by examiner

*Primary Examiner* — Nimesh G Patel
(74) *Attorney, Agent, or Firm* — Donald E. Stout; Stout, Uxa & Buyan, LLP

(57) ABSTRACT

In one embodiment, a booting method using a system firmware with multiple embedded controller firmwares is provided to load a real embedded controller firmware into a memory of an embedded controller. In case the system firmware includes a header, an identification information of the real embedded controller firmware is included in the header and used to acquire a start code address of the real embedded controller firmware. Such booting method allows a common executable file being applied to different systems that operate embedded controllers with different embedded controller firmwares.

7 Claims, 4 Drawing Sheets

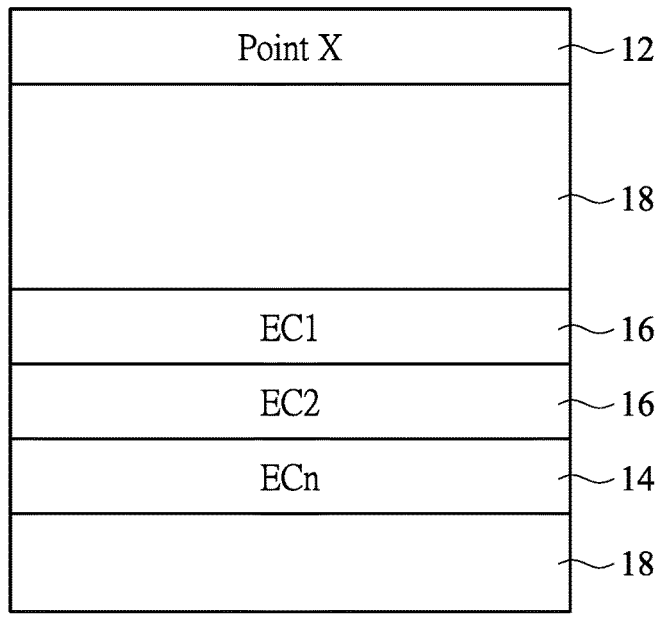

FIG. 1 providing a booting read-only memory that stores a system firmware including a plurality of embedded controller firmwares and a header ~20 connecting to the booting read-only memory through the system of the electronic device when the system is powered on or the embedded controller has to load or reload firmware code into its memory, and obtaining a code start address of a corresponding (real) embedded controller firmware directed by an identification information included in the header ~22 locating the corresponding (real) embedded controller firmware by the start code address and loading the firmware code of the corresponding (real) embedded controller firmware into the memory of the embedded controller ~24

FIG. 2

BOOTING METHOD USING SYSTEM FIRMWARE WITH MULTIPLE EMBEDDED CONTROLLER FIRMWARES

CROSS-REFERENCE TO RELATED APPLICATIONS

The entire contents of Taiwan Patent Application No. 107110833, filed on Mar. 29, 2018, from which this application claims priority, are incorporated herein by reference.

BACKGROUND OF THE INVENTION

1. Field of the Invention

The present invention relates to a booting method of system of an electronic device, and more particularly, relates to a booting method of system of a portable electronic device.

2. Description of Related Art

As the laptop's hardware (e.g., the peripheral input/output devices) are becoming more and more complex, it may not be possible to use a single embedded controller (EC) firmware to support and be compatible with different series of laptops. For example, a mobile device (e.g., notebook) equipped with a rechargeable battery is equipped with its own charging IC and charging management, and different EC firmwares are used for different series of notebooks. In addition, the Universal Serial Bus (USB) is used to connect an electronic device to a notebook. The functions of current developed USB Type-C are diversified, and the diversification results in an increase in the complexity of the embedded controller firmware.

Furthermore, the customers, such as the notebook providers, typically provide different executable files for different series of same type of notebooks to update the system of each series of notebooks. However, under the cost considerations, there is a need for the different series of same type of laptops to share the same executable file.

SUMMARY OF THE INVENTION

The present invention provides a booting method by using a same executable file to support a system firmware with different embedded controller firmwares. Multiple embedded controller firmwares are stored in a read-only memory of a Basic Input/Output System (BIOS) of the electronic device. When the electronic device system with different hardware devices is turned on, the corresponding embedded controller firmware can be obtained and stored in the storage device of the embedded controller.

According to an aspect of the present invention, a booting method is executed by a system of electronic device. The system of electronic device may include a central processing unit (CPU), a platform controller hub (PCH), a non-volatile storage device connected to the central processing unit and the platform path controller, and an embedded controller. The booting method comprises the steps of: providing a booting read-only memory, the bootable read-only memory having a system firmware with a plurality of embedded controller firmwares and a header; when the system is powered on or the embedded controller needs to load or reload the firmware code into a memory of the embedded controller, an identification information according to the header of the system firmware is used for obtaining a start code address of a real embedded controller firmware from one of the embedded controller firmwares, wherein the identification information corresponds to the real embedded controller firmware; and a code of the real embedded controller firmware is loaded into a random-access memory of the embedded controller according to the start code address.

In an embodiment, the identification information of the aforementioned header may be unchangeable or can be modified according to the content of a basic embedded controller firmware.

According to an aspect of the present invention, a booting method comprises the steps of: providing a booting read-only memory that has a search start point and storing a plurality of embedded controller firmwares, wherein the embedded controller firmwares comprises a basic embedded controller firmware and a real embedded controller firmware, and the address of the basic embedded controller firmware is prior to other embedded controller firmware; accumulatively searching the booting read-only memory to find the basic embedded controller in an address sequence from the search start point when the system is powered on or the embedded controller needs to load or reload the firmware code into a memory of the embedded controller; loading an firmware code of the basic embedded controller firmware into the memory of the embedded controller; executing the basic embedded controller firmware to judge and obtain an identification information of the real embedded controller firmware; and in accordance with the identification information, erasing or partially erasing the basic embedded controller firmware and erasing or selectively/partially erasing the embedded controller firmwares whose address is prior to the real embedded controller firmware in the booting read-only memory.

In an embodiment, the booting method further comprises: accumulatively searching the booting read-only memory to find the real embedded controller firmware from the search start point in the address sequence after the erasing step; and loading the firmware code of the real embedded control firmware into the memory of the embedded controller.

In an embodiment, the embedded controller firmwares whose addresses are posterior to the address of the real embedded controller firmware are partially or completely erased.

BRIEF DESCRIPTION OF THE DRAWINGS

FIG. 1 is a schematic diagram showing a system firmware in accordance with a first embodiment of the present invention.

FIG. 2 is a flow chart of a booting method using the system firmware of FIG. 1.

DETAILED DESCRIPTION OF THE PREFERRED EMBODIMENT

Figure 3:
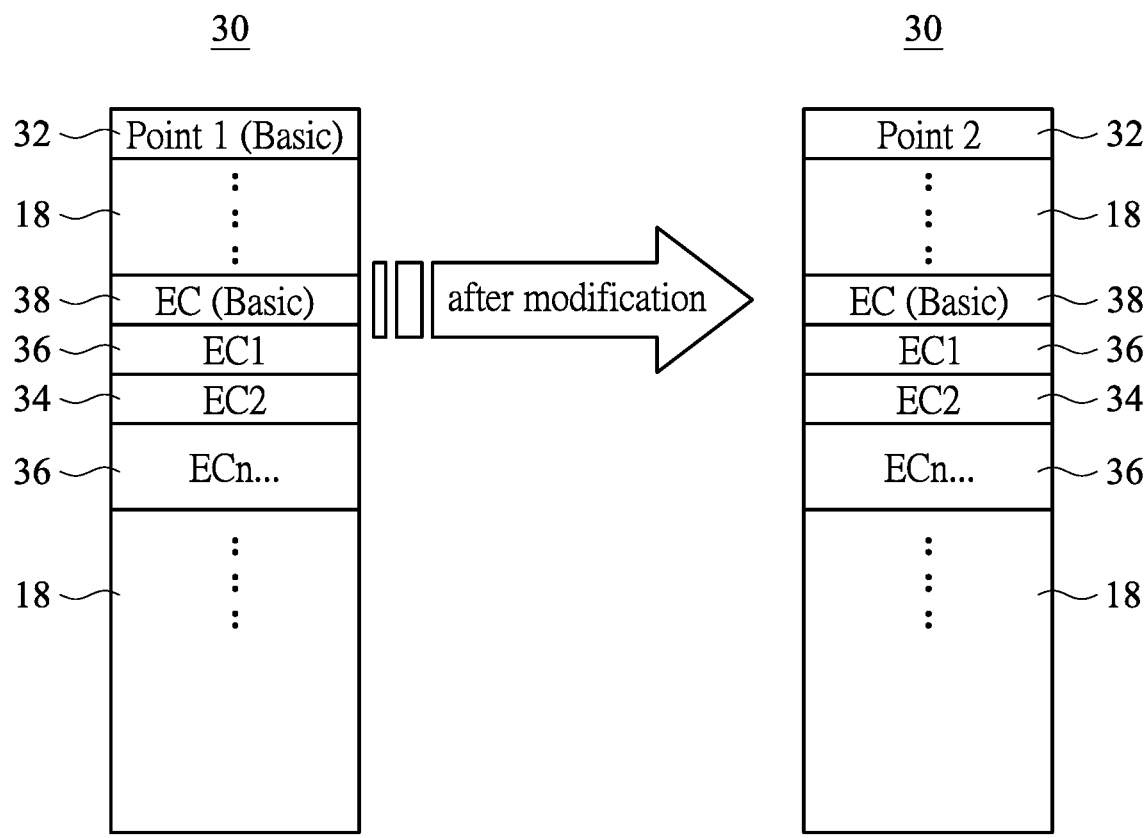
FIG. 3 is a schematic diagram showing a system firmware and its modification in accordance with a second embodiment of the present invention.

Reference will now be made in detail to those specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components.

In this text, the term "system of electronic device" may refer to a central processing unit (CPU), a platform controller hub (PCH), a non-volatile storage device connected to the central processing unit and the platform controller hub, and an embedded controller. The non-volatile storage device may be a read-only memory (ROM) of a basic input/output system (BIOS) or a memory that can be reprogrammed in several ways, e.g., a programmable read only memory (PROM), an erasable programmable read only memory (EPROM), an electrically erasable programmable read-only memory (EEPROM), a Serial Peripheral Interface ROM (SPI ROM), a SPI ROM having Enhanced Serial Peripheral Interface (eSPI) Specification, and so forth. In addition, the central processing unit stores an initialization code for the central processing unit to use and execute a series of initialization instructions. The volatile storage device may be a BIOS storage area, a management engine (ME), a non-volatile random access memory (NVRAM), etc., which includes, but is not limited to, a basic input/output system.

In this text, the term "embedded controller," such as a universal microcontroller, includes a memory (such as a random access memory (RAM)) storing an embedded controller firmware, and is in charge of peripheral devices such as keyboards, mice, batteries, end-user controlled keys, and other input/output (I/O) devices connected through the universal serial bus (USB). The following embodiments of the present invention will be illustrated by taking the embedded controller of the Charger IC as an example. For example, a same type of commercially-available laptop may have several series with each has an announced main function differing from others. Each series of notebooks may be equipped with a rechargeable battery and charge management that are similar but are not identical to others. Each series of laptops, even the same series but different models of notebooks, must be managed by the corresponding embedded controller to achieve the best performance.

FIG. 1 is a schematic diagram showing a system firmware 10 with a header and an instruction section in accordance with a first embodiment of the present invention. Referring to FIG. 1, the term "system firmware" in the present invention may refer to a system BIOS code, that is, one of the programs first run after the system of the electronic device is powered on. In the first embodiment, the system firmware 10 includes a header "Point X" 12 and a plurality of embedded controller firmwares EC1, EC2 . . . ECn 14/16 arranged in sequence. For the convenience of explanation, X denotes positive integers 1, 2, 3, etc., "Point X" represents identification information of the motherboard system to which the booting process is to be directed, and "ECn" refers to the embedded controller firmware that corresponds to the embedded controller and is indicated by the identification information. Where "n" is also a positive integer such as 1, 2, 3, etc., and n must have a value equal to x to indicate the correspondence. For example, the identification information of the series 1 notebook is "Point 1", and the embedded controller firmware EC1 corresponds to the identification information, and each of other embedded controller firmwares, such as EC2, EC3, and so on, does not correspond to the identification information "Point 1". It can be understood that the integer "1" is merely used to describe the embodiment rather than to limit the present invention. Further, in the first embodiment, the embedded controller firmwares 14 and 16 may correspond to the same type of embedded controllers (e.g., charger ICs), but the functions performed between them may be different. For example, series 1, series 2 . . . , and series X charger ICs can differ in functionality or performance.

Referring to FIG. 1 again, in this embodiment of the present invention, the system firmware 10 includes embedded controller firmwares 16 that not correspond with the identification information in addition to the header 12 and the corresponding embedded controller firmware 14. Therefore, the system firmware 10 is an executable file with multiple embedded controller firmwares. Even if the system firmware 10 includes a plurality of embedded controller firmwares 14/16, the header 12 points to the corresponding embedded controller firmware 14, which may also referred as to the real embedded controller firmware 14. In addition, it can be understood that the system firmware 10 further includes other instruction sections 18 during a general booting procedure of the system of electronic device, such as a management engine (ME), a non-volatile random access memory (NVRAM), a basic input/output system main code, a BIOS bootblock code, and the likes. Those sections are not related to the present invention and will not be described herein.

FIG. 2 is a flow chart showing a booting method using the system firmware in accord with the first embodiment of the present invention. Please refer to FIGS. 1 and 2, the booting method is used to load a real embedded controller firmware of the embedded controller when the system is powered on or the embedded controller is required to load or reload the firmware code into its memory. Step 20: providing a booting read-only memory that stores a system firmware including a plurality of embedded controller firmwares and a header. In which the header contains an identification information (a first identification information) that is directed to one of the embedded controller firmwares. When the system is powered on or the embedded controller has to load or reload the firmware code into its memory, the embedded controller is connected to the booting read-only memory through the system of the electronic device. According to the command of the header 12 of the system firmware 10, the corresponding embedded controller firmware 14 is directed by identification information included in the header 12 to obtain a code start address of the embedded controller firmware (step 22), and the code of the corresponding embedded controller firmware 14 is loaded into the memory of the embedded controller (step 24). In this embodiment, the header 12 only points to one of a plurality of embedded controller firmwares. Therefore, although the system firmware 10 includes a plurality of embedded controller firmwares, only the code start address of the embedded controller firmware 14 will be obtained. In addition, if the embedded controller firmware or the BIOS must be updated with a new code program in response to demand (flashing BIOS), the header 12 of the system firmware 10 in this embodiment is protected and modification of which is prohibited.

Referring again to FIGS. 1 and 2, the code start address is obtained at the embedded controller firmware 14 to which the header 12 directs, and the firmware code of corresponding embedded controller firmware 14 (the real embedded controller firmware) is found and obtained according to the code start address and is then loaded into the memory of the embedded controller (step 24). In this embodiment, the memory of the embedded controller may be a random access memory (RAM) and so forth. With such a booting method, manufacturers may provide firmware update supports by putting different embedded controller firmwares with similar but not identical functions in a common system firmware. By adjusting the identification information included in the header to point to one of the embedded controller firmwares and writing it in the BIOS read-only memory, the cost of preparing or using multiple executable files can be reduced.

Figure 4:
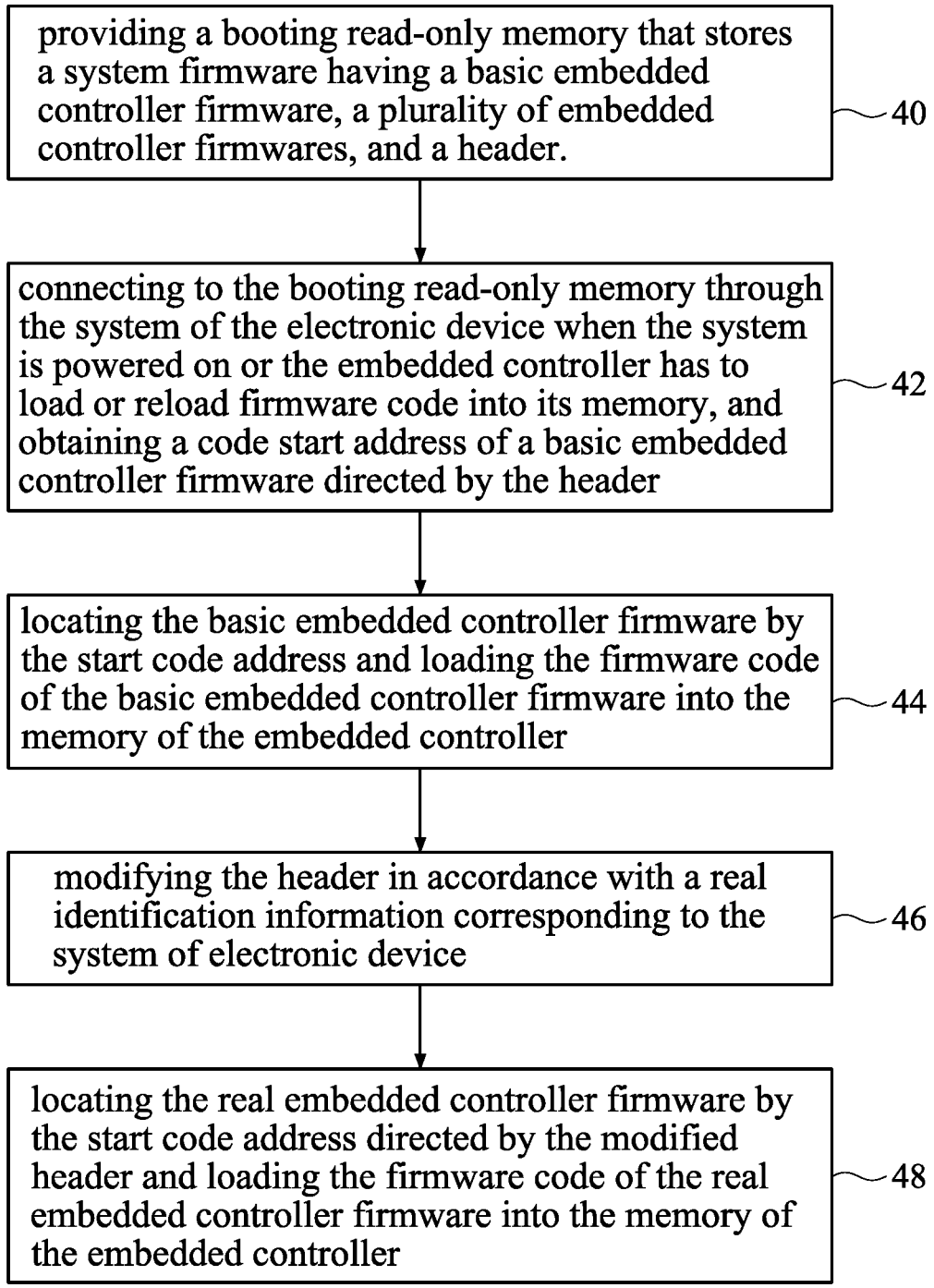
FIG. 4 is a flow chart of a booting method using the system firmware of FIG. 3.

FIG. 3 is a block diagram showing a system firmware and its modification in accord with a second embodiment of the present invention. FIG. 4 is a flow chart showing a booting method using the system firmware of FIG. 3. Referring to FIG. 3, similar to the system firmware 10 of the first embodiment, the instruction section of the system firmware 30 of the second embodiment has a header 32 and a plurality of embedded controller firmwares 34/36. The differences between the system firmware 10 and system firmware 30 are described as follows. Firstly, in addition to the corresponded real embedded controller firmware 34 and the non-corresponded embedded controller firmwares 36 of the motherboard system of the electronic device, the system firmware 30 of the second embodiment further includes a basic embedded controller firmware 38, and the header 32 includes an original identification information (second identification information) directed to the basic embedded controller firmware 38. Secondly, the basic embedded control firmware 38 includes the firmware code required for a general booting process. The general booting process allows most of the functions required for booting the system to operate normally, so as not to affect its normal booting procedure. Optionally, the basic embedded control firmware 38 may further include a code required for revising the header 32. However, the present invention does not limit that the header 32 is revised by the basic embedded control firmware 38, and the system BIOS may also be employed to amend the header 32. Therefore, in the second embodiment, according to the basic embedded control firmware 38, the original identification information included in the header 32 can be modified to be the (real) identification information (the first identification information) to re-direct to the real embedded controller firmware 34.

Referring to FIGS. 3 and 4, first, the step 40 is similar to step 20 of FIG. 2. A booting read-only memory is provided to stores a system firmware having a basic embedded controller firmware, multiple embedded controller firmwares, and a header. When the system is powered on or the embedded controller has to load or reload the firmware code into its memory, the embedded controller is connected to the booting read-only memory through the system of the electronic device, and the header 32 of the system firmware 30 directs to the basic embedded controller firmware 38 to obtain its start code address (step 42). After that, the basic embedded controller firmware is found and obtained according to the start code stress and is loaded into the memory of the embedded controller (step 44). After the embedded controller confirms the real identification information corresponding to the system through the firmware code of the basic embedded controller firmware, the system BIOS or the embedded controller firmware, etc., modifies the header 32 according to the real identification information (step 46), in which the second identification information is revised to the first identification information. In one embodiment, the booting method further comprises deleting or partially deleting the second identification information during or after the modification of the header. In the next time, after the system is powered on or the embedded controller has to load or reload the firmware code into its memory, the start code address of the real embedded controller firmware is directed by the real identification information (first identification information), and the real embedded controller firmware 34 is obtained by the start code address, and the firmware code of the real embedded controller firmware is then loaded into the memory of the embedded controller (step 48).

Figure 5:
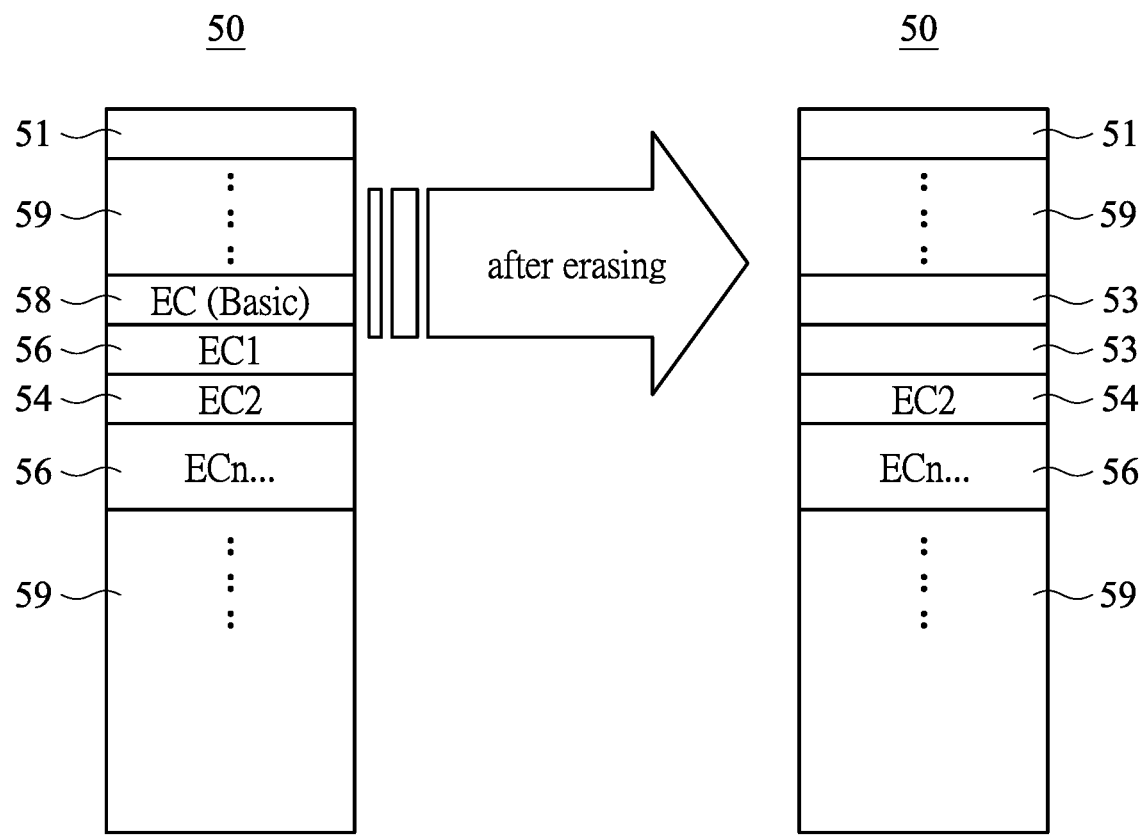
FIG. 5 is a schematic diagram showing a system firmware and its modification in accordance with a third embodiment of the present invention.

Considering that some system firmwares may have a file structure without a header, the concept of the present invention can also be applied to such file structures. FIG. 5 is a schematic diagram of a system firmware 50 and its modification according to a third embodiment of the present invention. Referring to FIG. 5, the system firmware 50 differs from the system firmware 10/30 in that it does not include a header. Instead, the embedded controller of this embodiment starts at a search start point 51, e.g., physical address 0 of the system firmware, to accumulatively search the system firmware of booting read-only memory in a sequence of address within a predetermined boundary to find a specific signature. The predetermined boundary can be, for example, but is not limited to, 4 KB or 64 KB. In this third embodiment, initially, the system firmware 50 stores other instruction sections 59, the basic embedded controller firmware 58, other embedded controller firmwares 56, and the real embedded controller firmware 54 corresponding to the system of electronic devices according to the order of the address numbers. In another embodiment of this invention, the arrangement may be other instruction sections 59, the basic embedded controller firmware 58, the real embedded controller firmware 54 corresponding to the system of the electronic device system, and other embedded controller firmwares 56. When the system is powered on or the embedded controller is required to load or reload the firmware code into its memory, the embedded controller is connected to the booting read-only memory through the system of the electronic device, and the basic embedded controller firmware 58 will be searched by the embedded controller prior to the real embedded controller firmware 54 and other embedded controller firmwares 56. Furthermore, the basic embedded controller firmware 58 may include identification information of the real embedded controller firmware 54 that corresponds to the system of electronic device, and may further include an instruction to partially or completely erase the firmwares whose addresses prior to the real embedded controller firmware 54, e.g., the basic embedded controller firmware 58 and other embedded controller firmwares 56. Therefore, after the basic embedded controller firmware 58 is found and its firmware code is loaded into the memory of the embedded controller of the system, the basic embedded controller firmware is executed to obtain an identification information of the real embedded controller firmware, so that the real embedded controller firmware 54 corresponding to the system of the electronic device can be confirmed. On the other hand, the firmwares prior to the real embedded controller firmware 54 will be completely erased or selectively partially erased to form one or more empty sections 53 so that when the embedded controller is reload, the real embedded controller firmware 54 can be loaded to the memory of the embedded controller. In addition, the embedded controller firmwares 56 whose address posterior to the real embedded controller firmware 54 may also be selectively partially or completely erased or retained. If the embedded controller firmwares 56 posterior to the real embedded controller firmware 54 are completely erased, only the real embedded controller firmware 54 remains in the system firmware 50. After that, the embedded controller reloads the real embedded controller firmware 54 from the system firmware 50. It can be understood that the modification instruction in the second embodiment or the erasing instruction in the third embodiment can be built into the BIOS code of the BIOS. Alternatively, the modification or the erasing can be done by the code of embedded controller firmware. In addition, in this embodiment, the memory block that originally stored the erased embedded controller firmware will be an area with no or residual block.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

Although specific embodiments have been illustrated and described, it will be appreciated by those skilled in the art that various modifications may be made without departing from the scope of the present invention, which is intended to be limited solely by the appended claims.

What is claimed is:

1. A booting method executed by a system of an electronic device, wherein the system of the electronic device comprises a central processing unit (CPU), a platform controller hub (PCH), a nonvolatile storage device connected to the central processing unit and the platform controller hub, and an embedded controller, and the booting method comprises the steps of:
   providing a booting read-only memory that stores a system firmware having a plurality of embedded controller firmwares, a basic embedded controller firmware, and a header having a second identification information directed to the basic embedded controller firmware, wherein one of the plurality of embedded controller firmwares is a real embedded controller firmware corresponding to the system of the electronic system;
   loading a firmware code of the basic embedded controller firmware into a memory of the embedded controller according to the second identification information;
   modifying the header so that the header includes a first identification information;
   obtaining a start code address of the real embedded controller firmware directed by the first identification information of the header of the system firmware; and
   loading a firmware code of the real embedded controller firmware into the memory of the embedded controller according to the start code address.

2. The booting method as recited in claim 1, further comprising deleting or partially deleting the second identification information during or after the modification of the header.

3. The booting method as recited in claim 1, wherein the step of providing the booting read-only memory (ROM) is to provide a serial peripheral interface ROM (SPI ROM) or a SPI ROM having enhanced serial peripheral interface (eSPI) specification as a read-only memory of basic input/output system or to provide a reprogrammable memory.

4. A booting method executed by a system of an electronic device, wherein the system of the electronic device comprises a central processing unit (CPU), a platform controller hub (PCH), a nonvolatile storage device connected to the central processing unit and the platform controller hub, and an embedded controller, the booting method is used to load a real embedded controller firmware of the embedded controller when the system is powered on or the embedded controller is required to load or reload firmware code into a memory of the embedded controller, and the booting method comprises the steps of:
   providing a booting read-only memory that includes a search start point and stores a plurality of embedded controller firmwares, wherein the plurality of embedded controller firmwares comprises a basic embedded controller firmware and the real embedded controller firmware, and the address of the basic embedded controller firmware is prior to other embedded controller firmwares;
   accumulatively searching the booting read-only memory from the search start point in an order of address number to find the basic embedded controller firmware when the system is powered on or the embedded controller is required to load or reload firmware code into the memory of the embedded controller;
   loading the firmware code of the basic embedded controller firmware into the memory of the embedded controller;
   executing the basic embedded controller firmware to obtain an identification information of the real embedded controller firmware; and
   erasing the basic embedded controller firmware and selectively erasing the embedded controller firmwares whose address prior to the real embedded controller firmware.

5. The booting method as recited in claim 4, further comprising:
   accumulatively searching the booting read-only memory from the search start point in an order of address number to find the real embedded controller firmware after the erasing step; and
   loading the firmware code of the real embedded controller into the memory of the embedded controller.

6. The booting method as recited in claim 4, wherein the erasing step further comprises completely or selectively partially erasing the embedded controller firmwares whose address posterior to the real embedded controller firmware.

7. The booting method as recited in claim 4, wherein the erasing step comprises completely or selectively partially erasing the basic controller firmware whose address number is prior to the real embedded controller firmware and completely or selectively partially erasing the embedded controller firmwares whose address number posterior to the real embedded controller firmware.

* * * * *